(12) United States Patent
Hanada et al.

(10) Patent No.: US 10,141,753 B2
(45) Date of Patent: Nov. 27, 2018

(54) STORAGE BATTERY SYSTEM (71) Applicant: TOSHIBA MITSUBISHI-ELECTRIC INDUSTRIAL SYSTEMS CORPORATION, Chuo-ku (JP)

(72) Inventors: Masato Hanada, Tokyo (JP); Daisuke Tsurumaru, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 82 days.

(21) Appl. No.: 15/516,449

(22) PCT Filed: Oct. 21, 2014

(86) PCT No.: PCT/JP2014/077978
§ 371 (c)(1),
(2) Date: Apr. 3, 2017

(87) PCT Pub. No.: WO2016/063356
PCT Pub. Date: Apr. 28, 2016

(65) Prior Publication Data
US 2018/0226811 A1  Aug. 9, 2018

(51) Int. Cl.
*H02J 7/00* (2006.01)
*H02J 7/04* (2006.01)
*H01M 10/44* (2006.01)

(52) U.S. Cl.
CPC ......... *H02J 7/0021* (2013.01); *H01M 10/441* (2013.01); *H02J 7/04* (2013.01)

(58) Field of Classification Search
CPC .................................................. H02J 7/0021
(Continued)

(56) References Cited

U.S. PATENT DOCUMENTS 6,075,340 A * 6/2000 Koenck .............. G01R 31/3655
320/112
2008/0258675 A1* 10/2008 Caldwell ........... H01L 31/02021
320/101
(Continued)

FOREIGN PATENT DOCUMENTS

JP  2014-124063 A  7/2014
JP  2014-128063 A  7/2014

OTHER PUBLICATIONS

International Search Report dated Jan. 6, 2015, in PCT/JP2014/077978, filed Oct. 21, 2014.

*Primary Examiner* — Suresh Memula
(74) *Attorney, Agent, or Firm* — Oblon, McClelland, Maier & Neustadt, L.L.P.

(57) ABSTRACT

A storage battery system relating to the present invention includes N PCSes. Each of the N PCSes is connected to an individual storage battery module group. The storage battery module group is formed by connecting one or more storage battery modules in parallel. A maximum power storage capacity of the storage battery modules configuring at least one storage battery module group is different from a maximum power storage capacity of the storage battery modules configuring the other storage battery module groups. A controller determines charge/discharge amounts of the individual PCSes on the basis of a charge/discharge request from an EMS, the maximum power storage capacity of the storage battery module, the number of the storage battery modules and a storage battery capacity ratio.

1 Claim, 5 Drawing Sheets

(58) Field of Classification Search
USPC .......................................................... 320/134
See application file for complete search history.

(56) References Cited

U.S. PATENT DOCUMENTS

| | | | |
|---|---|---|---|
| 2010/0090650 A1* | 4/2010 | Yazami ............... | H01M 10/443 320/132 |
| 2011/0163724 A1* | 7/2011 | Migaud ................ | B60W 10/08 320/136 |
| 2012/0013175 A1* | 1/2012 | Newman, Jr. ......... | B60R 16/033 307/9.1 |
| 2012/0206098 A1* | 8/2012 | Kim ...................... | B60L 11/182 320/108 |
| 2014/0176079 A1 | 6/2014 | Ito | |

\* cited by examiner

STORAGE BATTERY SYSTEM

FIELD

The present invention relates to a storage battery system connected to a power system.

BACKGROUND

A power system is constructed by connecting power generation equipment and load equipment by a power transmission facility. There are power systems in various scales from a large-scale system connecting a plurality of large-scale power plants and many factories, commercial facilities and households to a small-scale system constructed within a specific facility. The power system of any scale includes an energy management system (EMS) that manages electric power supply/demand of the entire power system, and electric power supply by the power generation equipment and electric power demand by the load equipment are balanced by the EMS.

The storage battery system is connected to the power system described above, and used as a means for balancing the electric power supply/demand. It was thought before that it is difficult to store a large amount of power, however, since a storage battery of a large capacity such as a lithium-ion battery and sodium-sulfur battery is put into practical use, it is made possible to store the large amount of power. By connecting the storage battery system including such a storage battery to the power system, an operation is possible in which excess power is charged in the storage battery when supply is excessive in contrast with power demand, and power insufficiency is compensated by discharge from the storage battery when the supply is insufficient in contrast with the power demand.

One example of suitable uses of such a storage battery system is a combination with the power generation equipment utilizing natural energy such as sunlight and wind power. The power generation equipment utilizing the natural energy is being widely introduced in response to rise in awareness of energy problems or environmental problems in recent years. However, the power generation equipment utilizing the natural energy has a disadvantage that power cannot be stably supplied since generated power tends to be controlled by natural factors such as seasons and weather. The storage battery system is a system capable of making up for the disadvantage, and by combining the storage battery system with the power generation equipment utilizing the natural energy, the power can be stably supplied.

In the case of connecting the storage battery system to the power system, an operation of the storage battery system is managed by the above-described EMS. The storage battery system includes a power conditioning system (PCS) connected to a storage battery. The PCS has a function of converting AC power of the power system to DC power and charging the DC power to the storage battery and a function of converting the DC power of the storage battery to the AC power and discharging the AC power to the power system. A charge/discharge request is supplied from the EMS to the PCS and the PCS is operated according to the charge/discharge request so that power reception from the power system to the storage battery or discharge from the storage battery to the power system is achieved. Note that the charge/discharge request supplied from the EMS to the PCS is determined so as to balance the electric power supply/demand in the entire power system.

Figure 1:
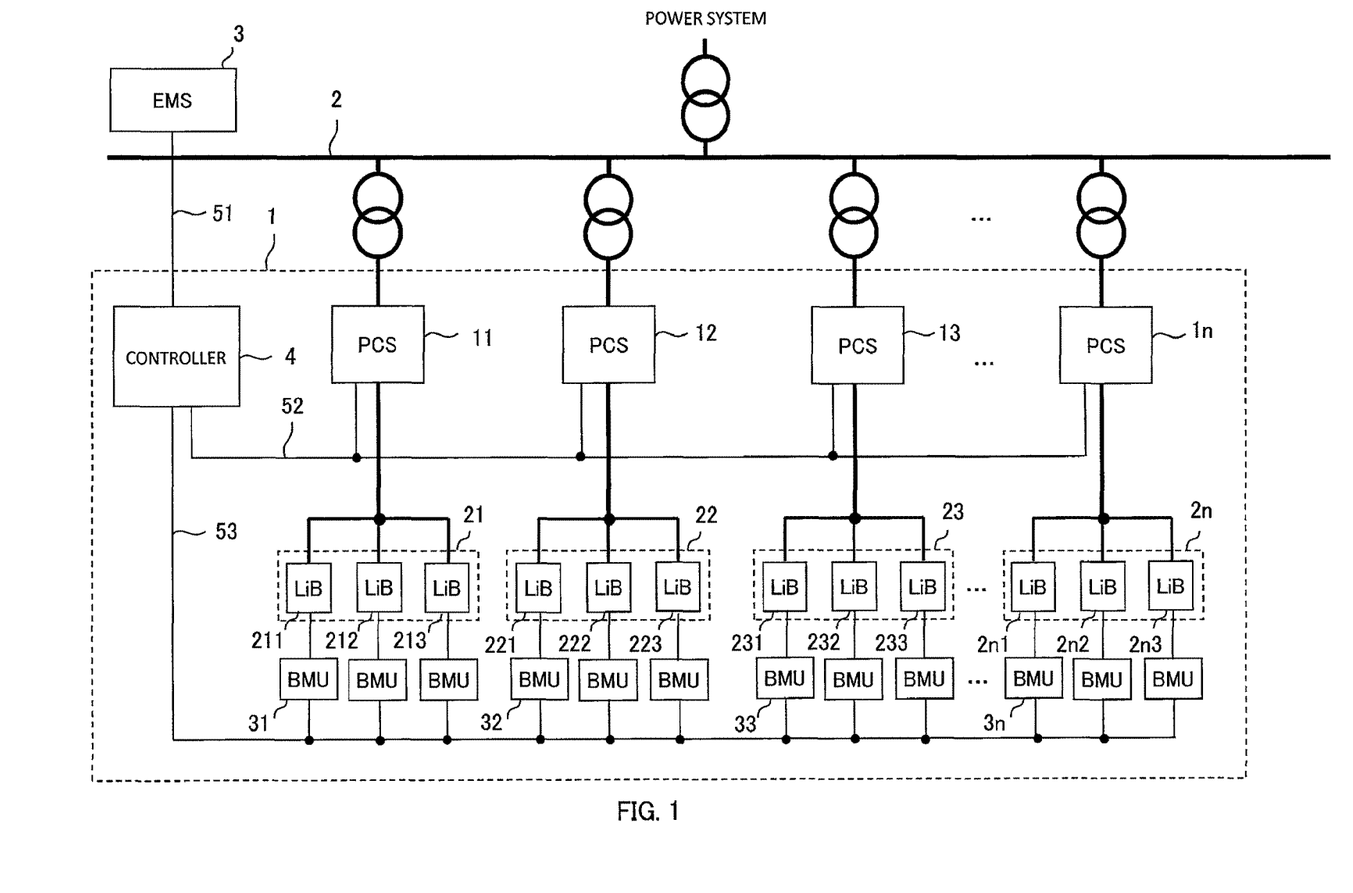
FIG. 1 is a conceptual configuration diagram for describing a system configuration relating to an embodiment 1 of the present invention.

Note that the applicant recognizes a literature described below as the one associated with the present invention. In FIG. 1 of JP 2014-124063 A, one example of the storage battery system including a plurality of PCSes connected to a power system is drawn.

CITATION LIST

Patent Literature

[PTL 1] JP 2014-124063 A

SUMMARY

Technical Problem

For a storage battery, a service life changes depending on a held SOC (State Of Charge). In order to uniformize deterioration degrees of a plurality of storage batteries, in a storage battery system, it is needed to perform operations keeping the SOCs of the individual storage batteries uniform. Conventionally, in the storage battery system including a plurality of PCSes, in the case that the storage batteries connected to the individual PCSes are the storage batteries of the same kind of the same maker, a total charge/discharge amount according to a charge/discharge request is proportionately divided by the plurality of PCSes and charge/discharge control is executed.

However, due to scale increase and diversification of the storage battery system, the PCSes to which the storage batteries of the different makers are connected may be combined to configure the storage battery system. In such a storage battery system, the maximum power storage capacity of the storage battery becomes different among the PCSes. In such a storage battery system, when the total charge/discharge amount according to the charge/discharge request is proportionately divided by the plurality of PCSes simply, since influence on the SOC by charge/discharge is large for the storage battery of the small maximum power storage capacity, the SOC of the storage battery varies among the PCSes.

The present invention is implemented in order to solve the above-described problem, and an object is to provide a storage battery system capable of performing control so as to uniformize the SOC of the storage battery among the PCSes, in the storage battery system in which the maximum power storage capacity of the storage battery is different among the PCSes.

Solution to Problem

In order to achieve the above-described object, a storage battery system relating to an embodiment of the present invention is configured as follows.

The storage battery system relating to the embodiment of the present invention is connected to a power system and is configured to be operated on the basis of charge/discharge requests from an EMS that manages electric power supply/demand of the power system. A scale and a configuration of the power system to which the storage battery system relating to the embodiment of the present invention is connected are not limited.

The storage battery system relating to the embodiment of the present invention includes a plurality of storage battery module groups, a plurality of battery management units, a plurality of PCSes, and at least one controller.

The storage battery system relating to the embodiment of the present invention includes N (N≥2) PCSes. Each of the N PCSes is connected to the individual storage battery module group. The storage battery module group is formed by connecting one or more storage battery modules in parallel. The maximum power storage capacity of the storage battery modules configuring at least one storage battery module group is different from the maximum power storage capacity of the storage battery modules configuring the other storage battery module groups.

The storage battery module may be configured by a single storage battery cell, or may be configured as an assembly of a plurality of storage battery cells. As a kind of the storage battery, the storage battery of a large capacity such as a lithium-ion battery, a sodium-sulfur battery or a nickel-hydrogen battery is preferable.

Battery management units are devices that monitor a state of the storage battery module groups. One battery management unit may be provided for the storage battery module groups, or one battery management unit may be provided for each of the storage battery module respectively. Examples of monitoring items by the battery management unit are state amounts of a current, a voltage and a temperature or the like. The battery management unit measures the state amount which is the monitoring item at all times or in a predetermined cycle by a sensor, and outputs a part or all of obtained data to outside as storage battery information. The storage battery information includes the maximum power storage capacity of the storage battery module, the number of the storage battery modules, and a storage battery capacity ratio to be described later.

The PCSes are devices that connect the storage battery to the power system, and have a function of converting AC power of the power system to DC power and charging the DC power to the storage battery module groups, and a function of converting the DC power of the storage battery module groups to the AC power and discharging the AC power to the power system. The PCS is also referred to as a power conditioner, and a charge power amount to the storage battery module groups and a discharge power amount from the storage battery module groups are adjusted by the PCS.

The controller is a device interposed between an EMS and N PCSes. The controller receives charge/discharge requests supplied from the EMS to the storage battery system. The controller is configured to receive storage battery information supplied from the battery management units together with the charge/discharge requests and control N PCSes on the basis of the charge/discharge requests and the storage battery information.

The controller includes a charge/discharge command unit. The charge/discharge command unit determines a charge/discharge amount of each of the N PCSes so as to satisfy a relational expression (1) below.

[Expression 1]

$$P_i = Preq \times \frac{Bnum_i \times Cratio_i}{\sum_{i=1}^{N}(Bnum_i \times Cratio_i)} \quad (1)$$

Where,
$P_i$ is the charge/discharge amount of an i-th PCS ($1 \leq i \leq N$),
Preq is the charge/discharge request, $Bnum_i$ is the number of the storage battery modules connected to the i-th PCS, and $Cratio_i$ is the storage battery capacity ratio. The storage battery capacity ratio means a capacity ratio of the maximum power storage capacity of the storage battery modules connected to the i-th PCS to a reference power storage capacity. The reference power storage capacity is, for example, the maximum power storage capacity of a predetermined storage battery module.

Advantageous Effects of Invention

According to the embodiment of the present invention, in the storage battery system in which the maximum power storage capacity of the storage battery is different among the PCSes, control can be performed so as to uniformize the SOC of the storage battery among the PCSes.

DESCRIPTION OF EMBODIMENTS

Hereinafter, an embodiment of the present invention will be described in details with reference to the drawings. Note that same signs are attached to elements in common in the respective diagrams and redundant descriptions are omitted.

Embodiment 1

[Entire Configuration of Embodiment 1]

FIG. 1 is a conceptual configuration diagram for describing a system configuration relating to the embodiment 1 of the present invention. A storage battery system 1 illustrated in FIG. 1 is connected to a power transmission facility 2 of a power system. In the power system, other than the power transmission facility 2, power generation equipment (omitted in the figure) and load equipment (omitted in the figure) may be connected to the power transmission facility 2. The storage battery system 1 is connected to a remote energy management system (hereinafter, EMS) 3 by a computer network 51. The EMS 3 manages electric power supply/demand of the power system such as a power generation amount of the power generation equipment, a charge/discharge amount of the storage battery system 1, and a power reception amount of the load equipment.

The storage battery system 1 includes a plurality of power conditioning systems (hereinafter, PCS) 11 to 1n, a plurality of storage battery module groups 21 to 2n, a plurality of battery management units (hereinafter, BMU) 31 to 3n, and a controller 4.

The storage battery system 1 includes N (N≥2) first to Nth PCSes. Hereinafter, in order to facilitate descriptions, a group configured by one PCS, the storage battery module groups connected to the PCS and the BMU is referred to as a "PCS group". Since basic configurations of the individual PCS groups are similar, here, a first PCS group is exemplified and described.

The first PCS group includes PCS 11. The PCS 11 is connected to the storage battery module group 21. The storage battery module group 21 is formed by connecting storage battery modules 211-213 in parallel. In FIG. 1, there are three columns of the storage battery modules, but it is just one example. A parallel number of the storage battery modules is determined on the basis of specifications of the PCS 11. Therefore, it is possible that the parallel number of the storage battery modules is one.

Each of the individual storage battery modules 211-213 is a module in which a plurality of cells are connected in series. Each cell is a lithium-ion battery (LiB). Note that, in the storage battery module group 21, the maximum power storage capacities of the storage battery modules 211-213 are the same.

The storage battery modules 211-213 are connected to BMU 31 by a signal line. The BMU 31 is connected to the controller 4 by a computer network 53. In FIG. 1, one BMU is connected to one storage battery module, but it is just one example. One BMU may be connected to the storage battery module group 21.

The BMU 31 monitors a state of the storage battery module group 21. Specifically, BMU 31 includes a current sensor, a voltage sensor, and a temperature sensor as means for measuring a state amount of the storage battery modules 211-213. A current flowing to the storage battery modules 211-213 is measured by the current sensor. A voltage of the storage battery modules 211-213 is measured by the voltage sensor. And, a temperature of the storage battery modules 211-213 is measured by the temperature sensor. The storage battery modules 211-213 are regularly monitored by the BMU 31. However, regular monitoring in the present embodiment is a concept including not only an operation of fetching continuous signals without an interval from a sensor but also an operation of fetching the signals of the sensor in a predetermined short cycle. The BMU 31 transmits storage battery information including information obtained by measurements by the respective sensors to the controller 4. In addition, the storage battery information may include the maximum power storage capacity of the storage battery module, the number of the storage battery modules, and a storage battery capacity ratio. Note that these pieces of information may be stored in the controller 4 beforehand.

The storage battery module group 21 connected to the PCS 11 and the BMU 31 are described above, and the above-described basic configuration is similar also for the storage battery module groups 22 to 2n connected to the PCSes 12 to 1n and the BMUs 32 to 3n. An important difference is a point that the maximum power storage capacity of the storage battery modules configuring one storage battery module group in the storage battery module groups 21-2n is different from the maximum power storage capacity of the storage battery modules configuring the other storage battery module groups. For example, the maximum power storage capacity of each of the storage battery modules 211-213 is 100 [kWh], and the maximum power storage capacity of each of storage battery modules 221-223 is 50 [kWh].

The controller 4 includes a memory including a ROM and a RAM or the like for example, an input/output interface that inputs and outputs various kinds of information, and a processor capable of executing various kinds of arithmetic processing on the basis of the various kinds of information. The controller 4 is connected to the EMS 3 by the computer network 51, to the BMUs 31 to 3n by the computer network 53, and to the PCSes 11 to 1n by a computer network 52.

The controller 4 plays a role of a controller that issues charge/discharge commands to the PCSes 11 to 1n. As one example, the controller 4 receives a charge/discharge request transmitted from the EMS 3 and the storage battery information transmitted from the BMUs 31 to 3n. The charge/discharge request includes a request regarding effective power and reactive power to be charged and discharged to/from the PCSes 11 to 1n. The controller 4 determines charge/discharge commands (corresponding to a charge/discharge amount [kW]) for the PCSes 11 to 1n on the basis of the charge/discharge request and the storage battery information, and transmits them to the PCSes 11 to 1n. In addition, the controller 4 also has a function of outputting a trip command to the PCSes 11 to 1n or the like.

The PCS 11 is connected to the power transmission facility 2 by a power transmission line through a transformer. The PCS 11 has a charge function of converting AC power of the power system to DC power and charging the DC power to the storage battery module group 21, and a discharge function of converting the DC power of the storage battery module group 21 to the AC power and discharging the AC power to the power system. A charge power amount to the storage battery module group 21 and a discharge power amount from the storage battery module group 21 are adjusted by the PCS 11. The charge/discharge power amounts are adjusted by the PCS 11 according to charge/discharge instructions supplied from the controller 4. The PCSes 12 to 1n also have a function similar to that of PCS 11.

[Characteristic Configuration of Embodiment 1]

Figure 2:
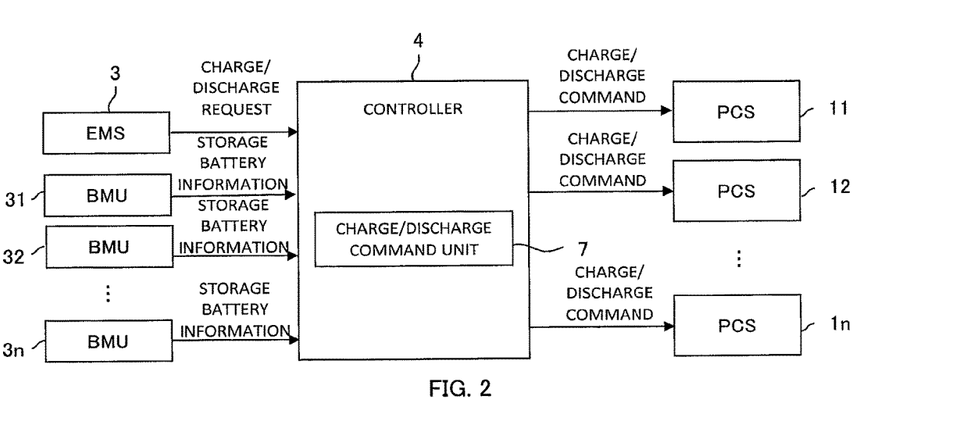
FIG. 2 is a block diagram of a system relating to the embodiment 1 of the present invention.

FIG. 2 is a block diagram of a system relating to the embodiment 1 of the present invention. Inside a block indicating the controller 4 in FIG. 2, a part of various functions that the controller 4 has is expressed by a block. An arithmetic resource is allocated to the block. Programs corresponding to the blocks are prepared in the controller 4, and by executing them by the processor, the functions of the blocks are realized in the controller 4.

(Charge/Discharge Command Function)

The controller 4 has a charge/discharge command function, and a charge/discharge command unit 7 is in charge of the function. The controller 4 receives the charge/discharge request from the EMS 3, and receives the storage battery information from the BMUs 31-3n. The charge/discharge command unit 7 determines the charge/discharge command on the basis of the charge/discharge request and the storage battery information, and transmits the charge/discharge command to the PCSes 11-1n.

Specifically, the charge/discharge command unit 7 calculates charge/discharge possible power from the voltages of the individual storage battery module groups included in the storage battery information. The voltage in the present embodiment means the voltage applied to both ends of the storage battery module. In addition, the SOC means a charge rate to full charge. The lithium-ion battery has a characteristic that the voltage is higher as it is fully charged and the voltage becomes lower as it is nearly empty. By utilizing the voltage-SOC characteristic, the SOC can be also calculated from a measured value of the voltage, and the charge/discharge possible power can be calculated from the SOC. Note that the SOC can be also calculated from an integrated value of the current included in the storage battery information. Note that the charge/discharge possible power calculated by the charge/discharge command unit 7 means a sum of discharge possible power of all the storage battery modules connected to the storage battery module group. This can be calculated from the voltages and the parallel number of the storage battery modules. The charge/discharge command unit 7 determines the charge/discharge commands for the PCSes 11-1n based on the charge/discharge request from the EMS 3 with the charge/discharge possible power as a constraint condition. However, the charge/discharge possible power as the constraint condition is a condition desirable to be satisfied in determination of the charge/discharge command but is not a condition that can never be omitted.

As described above, the storage battery system 1 includes N (N≥2) PCSes. Each of the N PCSes is connected to the individual storage battery module group. The storage battery module group is formed by connecting one or more storage battery modules in parallel. The maximum power storage capacity of the storage battery modules configuring at least one storage battery module group is different from the maximum power storage capacity of the storage battery modules configuring the other storage battery module groups. In such a configuration, the charge/discharge command unit 7 determines the charge/discharge amount of each of the N PCSes so as to satisfy a relational expression (1) below.

[Expression 2]

$$P_i = Preq \times \frac{Bnum_i \times Cratio_i}{\sum_{i=1}^{N} (Bnum_i \times Cratio_i)} \quad (1)$$

Where, $P_i$ is the charge/discharge amount of an i-th PCS (1≤i≤N),

Preq is the charge/discharge request, $Bnum_i$ is the number of the storage battery modules connected to the i-th PCS, and $Cratio_i$ is the storage battery capacity ratio. The storage battery capacity ratio means a capacity ratio of the maximum power storage capacity of the storage battery modules connected to the i-th PCS to a reference power storage capacity. The reference power storage capacity is, for example, the maximum power storage capacity of a predetermined storage battery module.

Using FIG. 3, one example of specific calculation by the charge/discharge command unit 7 will be described.

Figure 3:
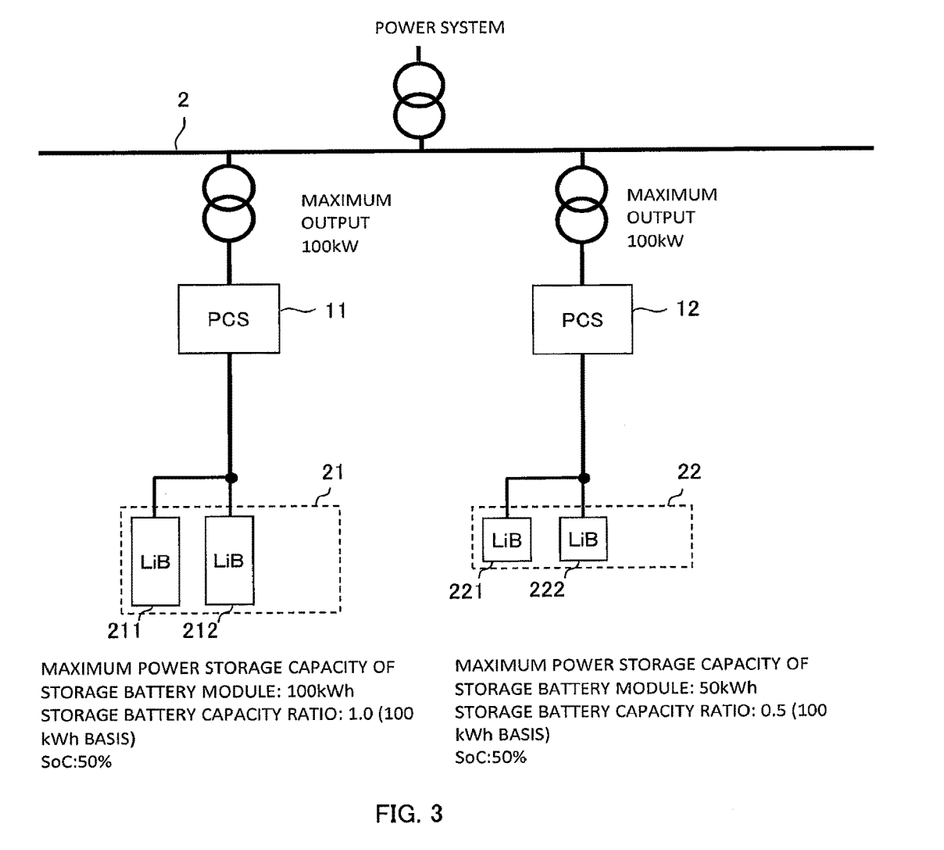
FIG. 3 is a diagram for describing a specific calculation example by a charge/discharge command unit 7 in the embodiment 1 of the present invention.

FIG. 3 is a diagram for describing a specific calculation example by the charge/discharge command unit 7 in the embodiment 1 of the present invention. The storage battery system illustrated in FIG. 3 includes two PCSes. The maximum output of the PCS 11 is 100 [kW], and the maximum output of the PCS 12 is 100 [kW]. The parallel number of the storage battery modules connected to the PCS 11 is 2, and the parallel number of the storage battery modules connected to the PCS 12 is 2. The maximum power storage capacity of each of the storage battery modules 211 and 212 is 100 [kWh], and the maximum power storage capacity of each of the storage battery modules 221 and 222 is 50 [kWh]. That is, the maximum power storage capacity per parallel (per line) of the PCS 11 is twice as big as that of the PCS 12. Therefore, the storage battery capacity ratio (Cratio in the expression (1)) is 1.0 on the side of the PCS 11 and is 0.5 on the side of the PCS 12.

In the above configuration, in the case that the discharge of 120 kW is requested as the charge/discharge request, the charge/discharge command unit 7 inputs the above-described condition to the relational expression (1), and calculates the output of each PCS as follows.

The output of the PCS 11 = 120 [kW] × 2 × 1.0 / (2 × 1.0 + 2 × 0.5)
= 80 [kW]

The output of the PCS 12 = 120 [kW] × 2 × 0.5 / (2 × 1.0 + 2 × 0.5)
= 40 [kW]

The charge/discharge command unit 7 determines the charge/discharge command for the PCS 11 indicating the discharge amount 80 [kW] and the charge/discharge command for the PCS 12 indicating the discharge amount 40 [kW].

(Flowchart)

Figure 4:
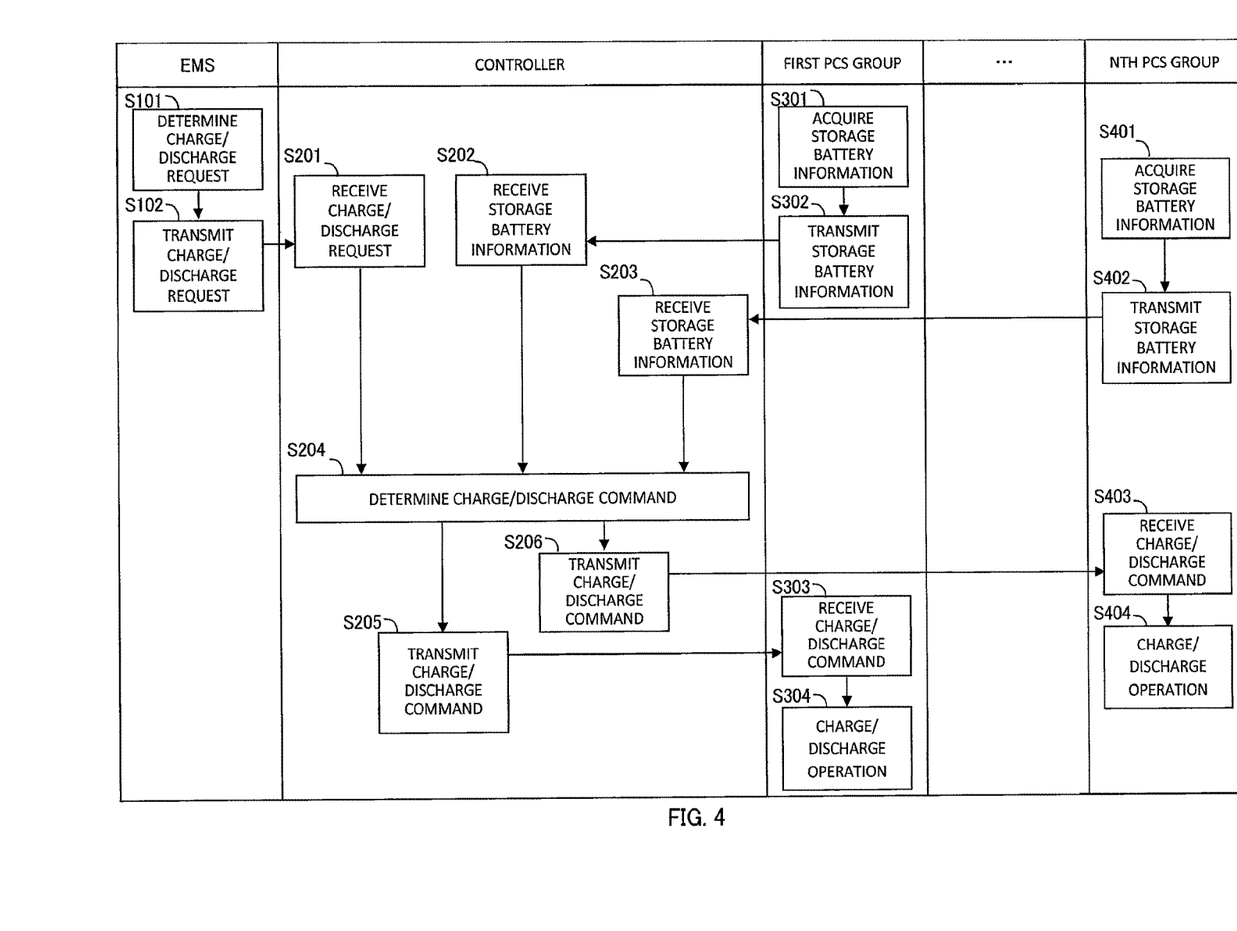
FIG. 4 is a flowchart of a control routine executed by storage battery system 1, in order to realize charge/discharge control based on charge/discharge requests from an EMS 3.

FIG. 4 is a flowchart of a control routine executed by the storage battery system 1, in order to realize charge/discharge control based on the charge/discharge request from the EMS 3. Processing of the controller 4 illustrated in the flowchart is processing realized by the functions of the charge/discharge command unit 7. The program that executes the processing in the flowchart illustrated in FIG. 4 is stored in the memory of the controller 4, and by reading and executing the program by the processor of the controller 4, the processing illustrated in FIG. 4 is realized.

In the routine illustrated in FIG. 4, first, the EMS 3 determines the charge/discharge request for the storage battery system 1 so as to balance the demand and supply of the power in the power system (step S101). The EMS 3 transmits the determined charge/discharge request to the controller 4 (step S102).

In the first PCS group, the BMU 31 regularly acquires the storage battery information using the various kinds of sensors (step S301). Thereafter, the BMU 31 transmits the acquired storage battery information to the controller 4 (step S302).

The processing similar to steps S301 and S302 is executed also for the second to nth PCS groups. For example, in an nth PCS group, the BMU 3n regularly acquires the storage battery information using the various kinds of sensors (step S401). The nth PCS group is a group including the PCS 1n, the storage battery module group 2n, and the BMU 3n. Thereafter, the BMU 3n transmits the acquired storage battery information to the controller 4 (step S402).

The controller 4 receives the charge/discharge request transmitted from the EMS 3 (step S201). In addition, the controller 4 receives the storage battery information transmitted from the BMU 31 of the first PCS group (step S202). Similarly, the controller 4 receives the storage battery information transmitted from the BMUs 32 to 3n of the second to nth PCS groups (step S203).

On the basis of the charge/discharge request received in step S201 and the storage battery information received in steps S202 and S203, the controller 4 calculates the charge/discharge amounts of the PCSes 11-1n, and determines the charge/discharge commands indicating the charge/discharge amounts (step S204). A method of determining the charge/discharge command executed in step S204 is as described in the description of the charge/discharge command function. Thereafter, the controller 4 transmits the charge/discharge command for PCS group to the first PCS 11 (step S205).

Similarly, the controller 4 transmits the charge/discharge command for the second to nth PCS groups to the PCSes 12 to 1*n* (step S206).

In the first PCS group, the PCS 11 receives the charge/discharge command transmitted from the controller 4 (step S303). The PCS 11 executes a charge/discharge operation according to the charge/discharge command (step S304).

Similarly, in the second to nth PCS groups, the PCSes 12 to 1*n* receive the charge/discharge command transmitted from the controller 4 (step S403). The PCSes 12 to 1*n* execute the charge/discharge operation according to the charge/discharge command (step S404).

As described above, according to the storage battery system 1 of the present embodiment, even in the storage battery system in which the maximum power storage capacity of the storage battery is different among the PCSes, control can be performed so as to uniformize the SOC of the storage battery among the PCSes.

(Modification)

Figure 5:
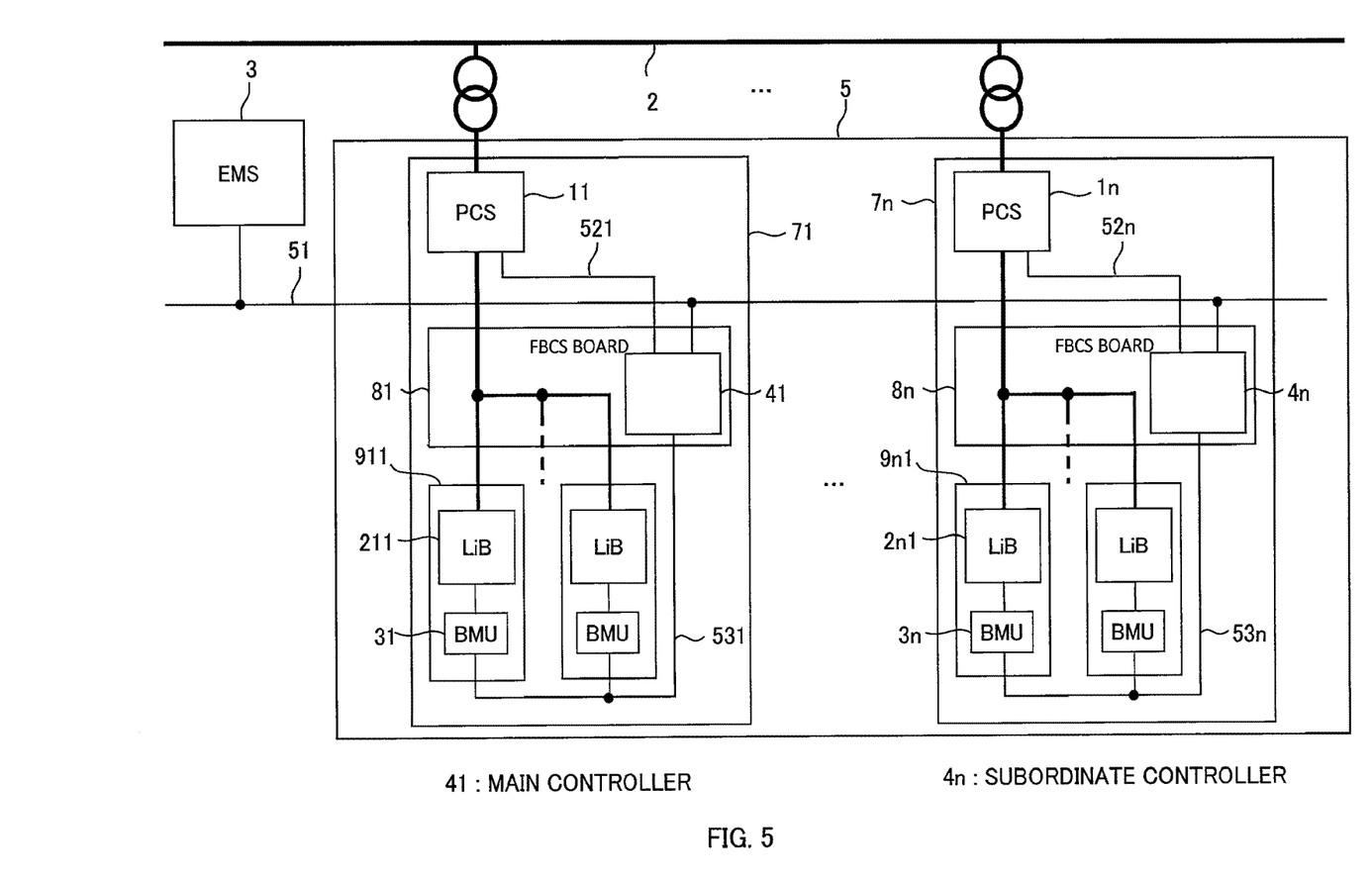
FIG. 5 is a conceptual configuration diagram for describing a modification of the system configuration relating to the embodiment 1 of the present invention.

Now, in the system configuration in FIG. 1, one controller 4 is arranged in the storage batteries, but the arrangement is not limited thereto. FIG. 5 is a conceptual configuration diagram for describing the modification of the system configuration relating to the embodiment 1 of the present invention. As illustrated in FIG. 5, one controller may be arranged in one PCS group. A main controller 41 illustrated in FIG. 5 receives the charge/discharge request from the EMS 3, receives the storage battery information from the BMU 31, and receives the storage battery information transmitted by the BMU 3*n* from a subordinate controller 4*n*. The main controller 41 calculates the charge/discharge amounts of the individual PCSes, and determines the charge/discharge commands indicating the charge/discharge amounts. A method of determining the charge/discharge commands is as described in the description of the charge/discharge command function. The main controller 41 transmits the charge/discharge command for the PCS 11 to the PCS 11, and transmits the charge/discharge command for the PCS 1*n* to the subordinate controller 4*n*. The subordinate controller 4*n* outputs the charge/discharge command for the PCS 1*n* to the PCS 1*n*.

REFERENCE SIGNS LIST

1 Storage battery system
2 Power transmission facility
3 Energy management system (EMS)
4 Controller
7 Charge/discharge command unit
11, 12, 13, 1*n* First power conditioning system (PCS)
21, 22, 23, 2*n* Storage battery module group
31, 32, 33, 3*n* Battery management unit (BMU)
211-213, 221-223, 231-233, 2*n*1-2*n*3 Storage battery module
41 Main controller
4*n* Subordinate controller
51, 52, 53, 531, 53*n* Computer network

The invention claimed is:

1. A storage battery system for which N (N≥2) power conditioning systems are connected to a power system and a storage battery module group formed by connecting one or more storage battery modules in parallel is connected to each of the N power conditioning systems, and which is operated on a basis of a charge/discharge request from an energy management system that manages electric power supply/demand of the power system, the storage battery system comprising:

battery management units that monitor a state of the storage battery module group; and a controller that receives the charge/discharge request and storage battery information supplied from the battery management units, and controls the N power conditioning systems on the basis of the charge/discharge request and the storage battery information, wherein the power conditioning system has a function of converting AC power of the power system to DC power and charging the DC power to the storage battery module group, and a function of converting the DC power of the storage battery module group to the AC power and discharging the AC power to the power system, wherein a maximum power storage capacity of the storage battery modules configuring at least one storage battery module group is different from a maximum power storage capacity of the storage battery modules configuring the other storage battery module groups, and wherein the controller includes a charge/discharge command unit that determines a charge/discharge amount of each of the N power conditioning systems so as to satisfy a relational expression (1) below:

[Expression 1]

$$P_i = Preq \times \frac{Bnum_i \times Cratio_i}{\sum_{i=1}^{N}(Bnum_i \times Cratio_i)} \quad (1)$$

where, $P_i$ is the charge/discharge amount of an i-th power conditioning system (1≤i≤N), Preq is the charge/discharge request, $Bnum_i$ is the number of the storage battery modules connected to the i-th power conditioning system, and $Cratio_i$ is a capacity ratio of the maximum power storage capacity of the storage battery modules connected to the i-th power conditioning system to a reference power storage capacity.

* * * * *